May 20, 1958     J. B. PICARD     2,835,364
OVERRUNNING CLUTCH

Filed June 1, 1954     3 Sheets-Sheet 1

JOHN B. PICARD
INVENTOR.

BY *Lyon† Lyon*
ATTORNEYS

JOHN B. PICARD
INVENTOR.

BY Lyon & Lyon
ATTORNEYS

United States Patent Office 2,835,364
Patented May 20, 1958

2,835,364

OVERRUNNING CLUTCH

John B. Picard, Los Angeles, Calif., assignor to The National Supply Company, Pittsburgh, Pa., a corporation of Pennsylvania Application June 1, 1954, Serial No. 433,338

4 Claims. (Cl. 192—45)

My invention relates to the general field of mechanical power transmission and is particularly directed to improvements in an overrunning clutch.

The principal object of this invention is to provide a novel form of heavy duty, high capacity overrunning clutch for transmitting power between axially aligned relatively rotatable members.

Another object of my invention is to provide a device of this type having a series of drive rollers positioned in an annulus between the members, together with means for moving each of the rollers toward driving position. Another object is to provide a device of this type having a novel form of spring and shoe assembly for each of the drive rollers.

Another object is to provide a device of this type in which spring means for moving each roller are provided and wherein such spring means occupy a minimum of circumferential space between the rollers so that a maximum number of rollers can be employed.

Another object of this invention is to provide a device of this type which is well suited to economical manufacture.

Other and more detailed objects and advantages will appear hereinafter.

Figure 1:
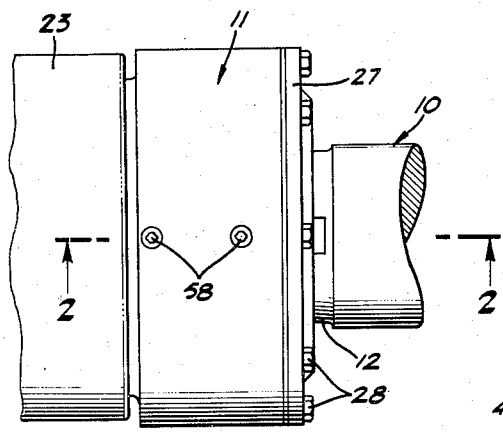
Figure 1 is a plan view showing the outline of an overrunning clutch assembly embodying my invention.

Referring to the drawings:

The members 10 and 11 are mounted for rotation about a common axis. While either may be the driving or driven member, for convenience the shaft 10 will be referred to as the driven member and the housing 11 referred to as the driving member. The shaft 10 is provided with a tapered end portion 12 having one or more keyways 13 formed therein. A key 14 is mounted in each of the keyways 13. A hub member 15 is provided with a central tapered bore 16 to receive the tapered shaft end 12 and is also provided with one or more keyways 17 to receive the keys 14. An end plate 18 is fixed to the end of the shaft 10 by means of threaded fastening elements 19 and this end plate extends into a counterbore 20 provided on the hub member 15. The hub member 15 is thus secured to turn with the shaft 10.

The housing member 11 is provided with a series of external spline teeth 21 for engagement with a series of internal spline teeth 22 provided on a driving ring 23. The driving ring 23 may be axially shiftable into driving position on an externally splined power driven member not shown. The housing member 11 is provided with a central cylindrical bore 24 which extends axially thereof and may be flared at one end as shown at 25. A bearing support sleeve 27 is fixed to the housing member 11 by means of threaded fastenings 28. A projecting portion 29 on the bearing support sleeve fits within the bore 26 and is sealed against leakage by means of a synthetic rubber O ring 30. Anti-friction bearing assemblies 31 are carried by the sleeve 27 and housing 11 and these bearing assemblies are mounted on the hub member 15. Suitable oil seals 32 are provided to prevent leakage. From this description it will be understood that the housing member 11 is rotatably supported on the hub member 15 and receives driving torque through the inter-engaging spline teeth 21 and 22.

Figure 3:
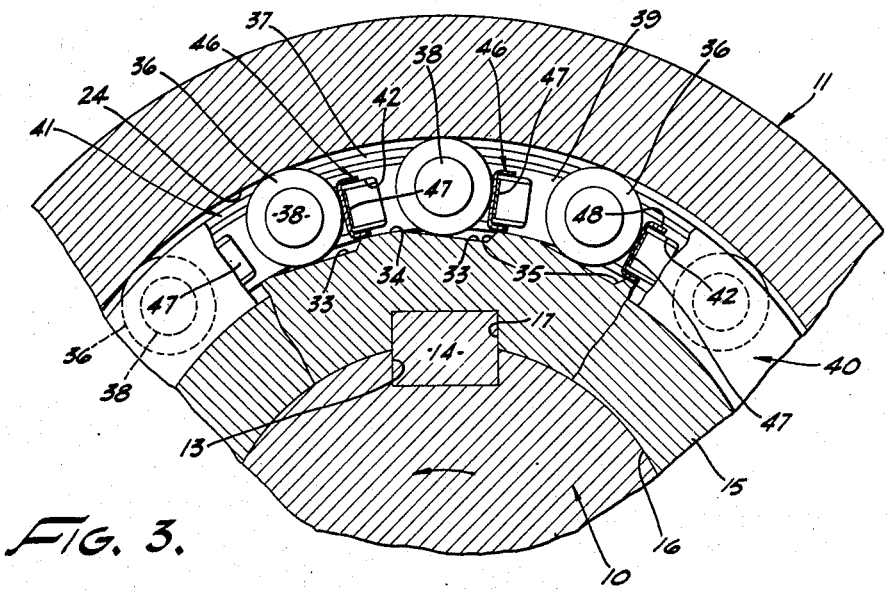
Figure 3 is a transverse sectional detail taken substantially on the lines 3—3 as shown in Figure 2.

As best shown in Figure 3, the hub member 15 is provided with a series of inclined surfaces 33 on its outer periphery. Each of these inclined surfaces 33 extends from an arcuate surface 34 at one end to a shoulder 35 at the other end. A series of drive rollers 36 is positioned within the annular space 37 between the housing member 11 and the hub member 15. Each of these drive rollers 36 is cylindrical in shape and is positioned to contact the cylindrical bore 24 in the housing member 11 and to contact one of the inclined surfaces 33 on the hub member 15.

Figure 4:
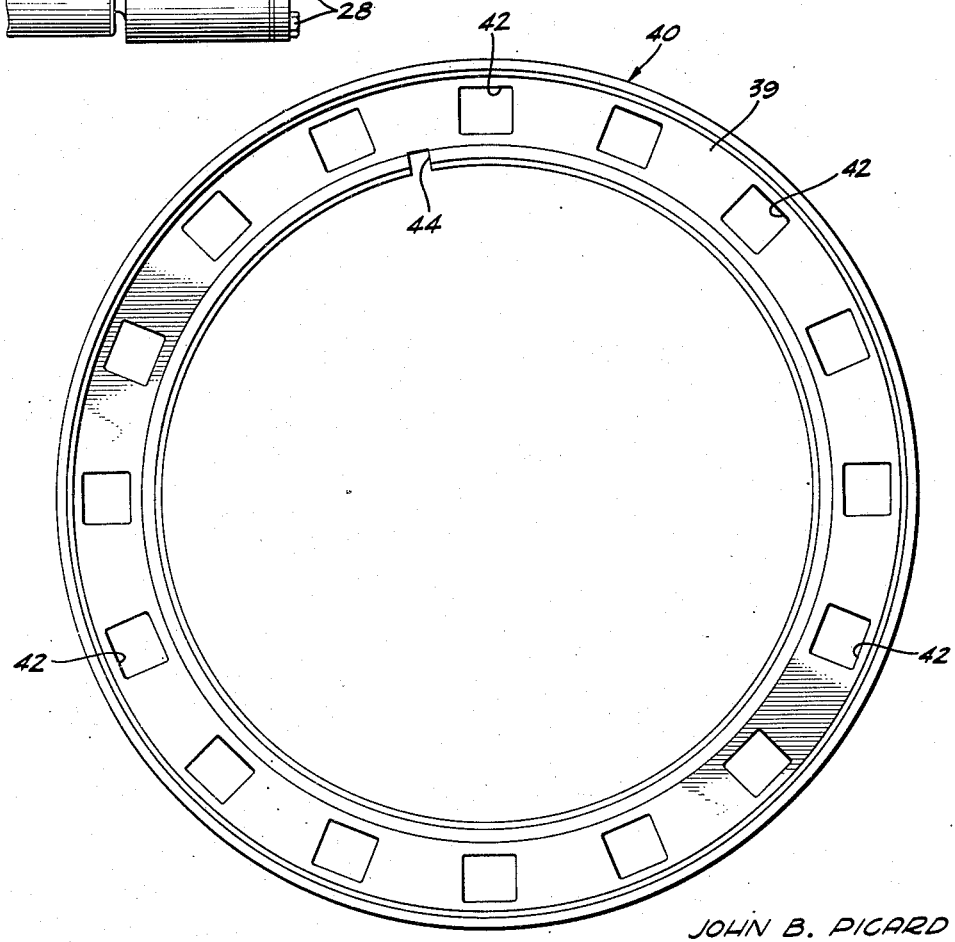
Figure 4 is a front elevation of one of the roller retainer rings.
Figure 5:
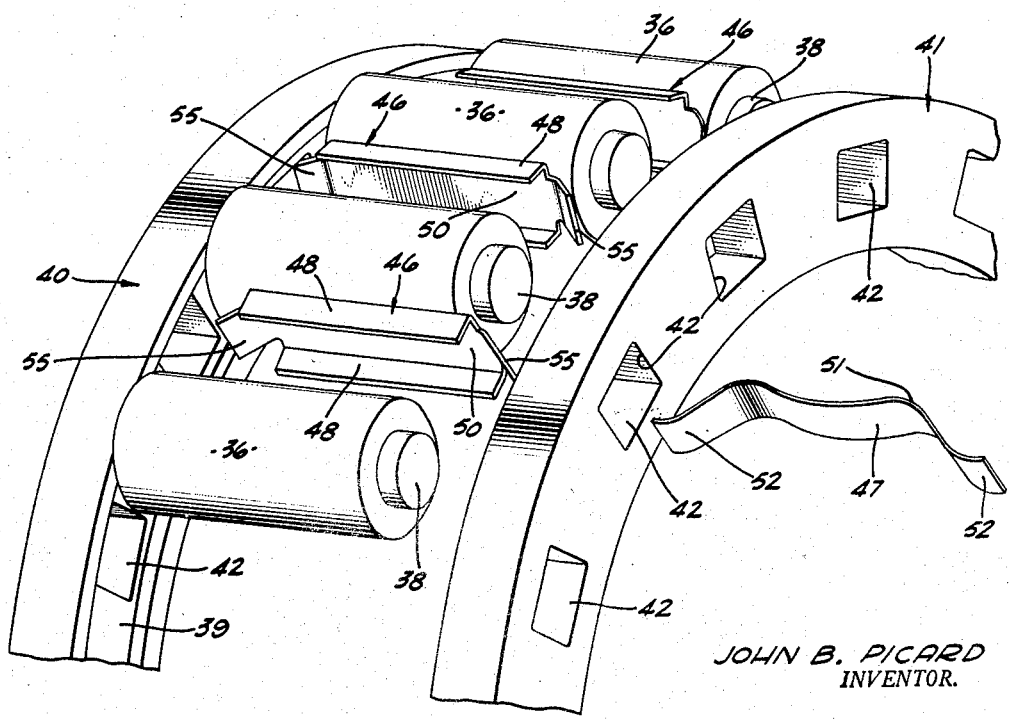
Figure 5 is an exploded perspective view showing the manner of assembly of the drive rollers, shoes and leaf springs.

Each of the drive rollers 36 is provided with integral trunnions 38 extending from the opposed ends thereof. Each trunnion 38 is received within an annular groove 39 provided in one of the roller retainer rings 40 and 41. These roller retainer rings are substantially duplicates. The roller retainer rings 40 and 41 are mounted on the hub member 15 and are prevented from turning with respect thereto by means of pins 43, which engage in keyways 44 provided in each retainer ring. The retainer rings are each engaged on one side by each of the anti friction bearing assemblies 31 and on the other side by a shoulder 45 on the hub member 15. These shoulders 45 define the extreme end of the inclined surfaces 33. As shown best in Figures 4 and 5, the roller retainer rings 40 and 41 are provided with a series of circumferentially spaced axially extending openings or windows 42 which intersect the annular groove 39. The windows 42 are defined by walls extending axially completely through the retainer rings.

Figure 2:
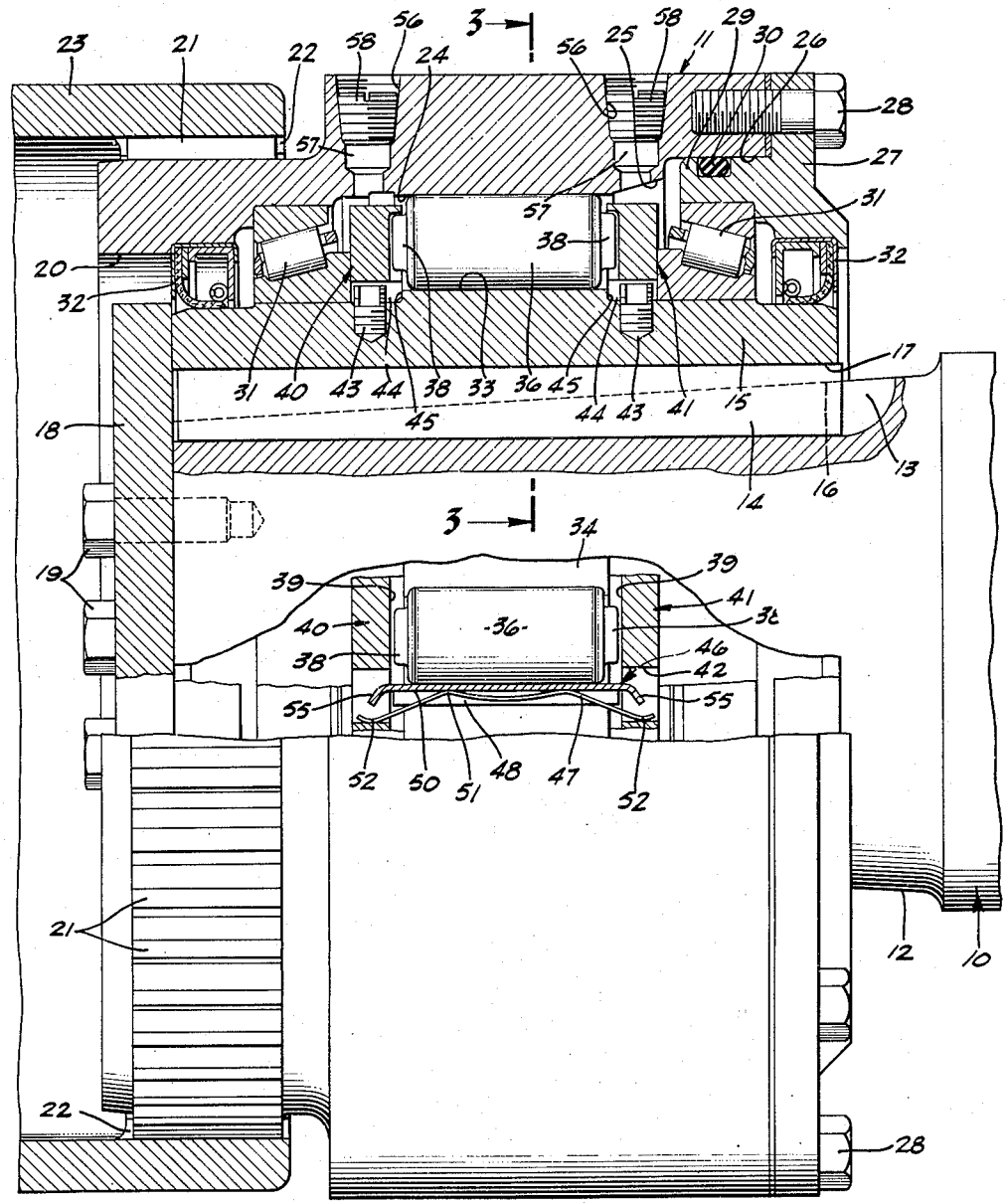
Figure 2 is a side elevation partly broken away and partly in section taken on the line 2—2 as shown in Figure 1.

Means are provided for resiliently urging each of the drive rollers 36 to move circumferentially and radially outwardly along its respective inclined surface 33. As shown in the drawings, this means includes a shoe 46 for each of the rollers 36 together with a leaf spring 47 for each of the shoes 46. Each shoe 46 may be formed of bronze strip and provided with stiffening flanges 48 extending along the edges thereof. The leaf springs 47 are preferably formed of spring steel and are narrow enough to be received between the opposed flanges 48 of the shoes 46. The shape of each spring 47 is preferably such that it engages the back surface 50 of its shoe at two spaced locations 51, as shown in Figure 2. The ends 52 of each leaf spring extend into and engage one wall of the windows 42. Each leaf spring 47 may be inserted axially into operative position through one of the windows 42. The forward face 53 of each shoe 46 engages a drive roller along a line element thereof. From this description it will be understood that each drive roller 36 is provided with an individual shoe 46 and spring 47 for moving it circumferentially along its respective inclined surface 33. It will be observed that the ends 55 of the shoes 46 extend into the windows 42 but do not engage the walls thereof.

The spring and shoe assembly described above occupies a minimum of space in the circumferential direction and hence a large number of rollers 36 may be employed. This is an advantageous feature for it distributes the load among a greater number of rollers and contact points on the members 11 and 15 and thus serves to minimize wear.

Suitable means may be provided for lubricating the anti friction bearings 36. As shown in the drawings, this means includes threaded openings 56 which communicate with the bore 24 through ports 57. The openings 56 are normally closed by plugs 58.

In operation, the shaft 10 is driven whenever the housing member 11 turns relative thereto in a counter-clockwise direction as viewed in Figure 3. In this event, the rollers 36 each move along their respective inclined surfaces 33 in a direction to bind against the cylindrical bore 24. Whenever the housing 11 rotates in a clockwise direction with reference to the shaft 10, as shown in Figure 3, the rollers 36 are each freed from driving contact with the cylindrical bore 24 and their respective inclined surface 33, and consequently the shaft is not driven.

Having fully described my invention, it is to be understood that I do not wish to be limited to the details herein set forth, but my invention is of the full scope of the appended claims.

I claim:

1. In an overrunning clutch assembly the combination of: an inner member provided with a series of inclined surfaces on its periphery, an outer member encircling the inner member and having a cylindrical bore, a plurality of rollers interposed between said members, each roller engaging the cylindrical bore and engaging one of said inclined surfaces, a pair of roller retainer rings fixed to said inner member and each having an annular groove, the rollers extending axially between said retainer rings and having portions thereof extending into said annular grooves, the retainer rings having circumferentially spaced axially extending windows intersecting said grooves, each window being defined by walls on the ring extending axially completely through the ring, a shoe to engage each of said rollers, the ends of the shoe being loosely received in opposed windows in said retainer rings, and a leaf spring associated with each of said shoes for moving each roller circumferentially along said inclined surfaces, the ends of each leaf spring extending into said opposed windows and engaging a wall surface thereof.

2. In an overrunning clutch assembly the combination of: an inner member provided with a series of inclined surfaces on its periphery, an outer member encircling the inner member and having a cylindrical bore, a plurality of rollers interposed between said members, each roller engaging the cylindrical bore and engaging one of said inclined surfaces, a pair of roller retainer rings fixed to said inner member and each having an annular groove, the rollers extending axially between said retainer rings, and having integral trunnions extending into said annular grooves, each retainer ring having circumferentially spaced axially extending windows defined by walls extending axially completely through the ring, a shoe adapted to engage each of said rollers, the ends of the shoe extending freely into opposed windows in said retainer rings, and a leaf spring associated with each of said shoes for moving each roller circumferentially along said inclined surfaces, the ends of each leaf spring extending into said opposed windows and engaging a wall surface thereof.

3. In an overrunning clutch assembly the combination of: an inner member provided with a series of inclined surfaces on its periphery, an outer member encircling the inner member and having a cylindrical bore, a plurality of rollers interposed between said members, each roller engaging the cylindrical bore and engaging one of said inclined surfaces, a pair of roller retainer rings fixed to said inner member and each having an annular groove, the rollers extending axially between said retainer rings, and having integral trunnions extending into said annular grooves, each retainer ring having circumferentially spaced axially extending windows, each window being defined by walls on the ring extending axially completely through the ring, a plurality of shoes, each shoe being adapted to engage one of said rollers, each shoe having parallel axially extending flanges, the ends of each shoe projecting freely into opposed windows in said retainer rings, a plurality of leaf springs, each leaf spring being received between the flanges on one of said shoes, the ends of each leaf spring extending into said opposed windows and engaging a wall of each window whereby the leaf springs act against said shoes to move the rollers circumferentially along said inclined surfaces.

4. In an overrunning clutch assembly the combination of: an inner member provided with a series of inclined surfaces on its periphery, an outer member encircling the inner member and having a cylindrical bore, a plurality of rollers interposed between said members, each roller engaging the cylindrical bore and engaging one of said inclined surfaces, a pair of roller retainer rings fixed to said inner member, the rollers extending axially between said retainer rings, the retainer rings having circumferentially spaced axially extending windows, each window being defined by walls extending axially completely through the ring, a shoe to engage each of said rollers, the ends of the shoe being loosely received in opposed windows in said retainer rings, and a leaf spring associated with each of said shoes for moving each roller circumferentially along said inclined surfaces, the leaf springs each being axially insertable through windows in at least one of said retainer rings, the ends of each leaf spring extending into said opposed apertures and engaging a wall of each window.

References Cited in the file of this patent

UNITED STATES PATENTS

| | | |
|---|---|---|
| 549,377 | Ljungstrom | Nov. 5, 1895 |
| 2,313,361 | Richards | Mar. 9, 1943 |
| 2,371,653 | Schuckers | Mar. 20, 1945 |